US012317002B2

(12) United States Patent
Zhang et al.

(10) Patent No.: US 12,317,002 B2
(45) Date of Patent: May 27, 2025

(54) SELECTING AVATAR FOR VIDEOCONFERENCE

(71) Applicant: Google LLC, Mountain View, CA (US)

(72) Inventors: Yinda Zhang, Daly City, CA (US); Ruofei Du, San Francisco, CA (US)

(73) Assignee: Google LLC, Mountain View, CA (US)

( * ) Notice: Subject to any disclaimer, the term of this patent is extended or adjusted under 35 U.S.C. 154(b) by 283 days.

(21) Appl. No.: 18/047,420

(22) Filed: Oct. 18, 2022

(65) Prior Publication Data
US 2024/0129437 A1    Apr. 18, 2024

(51) Int. Cl.
| | |
|---|---|
| *H04N 7/15* | (2006.01) |
| *G06F 3/16* | (2006.01) |
| *G06T 13/00* | (2011.01) |
| *G06T 13/20* | (2011.01) |
| *H04N 7/14* | (2006.01) |

(52) U.S. Cl.
CPC ............ *H04N 7/157* (2013.01); *G06F 3/167* (2013.01); *G06T 13/00* (2013.01)

(58) Field of Classification Search
CPC ......... H04N 7/157; G06F 3/167; G06T 13/00; G06T 15/00; G06T 17/00; G06T 19/00
See application file for complete search history.

(56) References Cited

U.S. PATENT DOCUMENTS

| | | | | |
|---|---|---|---|---|
| 2009/0158150 A1* | 6/2009 | Lyle | ........................ | A63F 13/79 |
| | | | | 715/706 |
| 2009/0300525 A1* | 12/2009 | Jolliff | ................ | H04M 1/72427 |
| | | | | 715/764 |
| 2010/0201693 A1* | 8/2010 | Caplette | ................. | G10H 1/368 |
| | | | | 345/474 |
| 2011/0014932 A1* | 1/2011 | Estevez | .................... | G01S 19/14 |
| | | | | 455/466 |
| 2012/0089908 A1* | 4/2012 | Miyaki | ............... | G07F 17/3237 |
| | | | | 715/706 |
| 2014/0036027 A1* | 2/2014 | Liu | ........................ | H04N 7/147 |
| | | | | 348/14.07 |
| 2015/0302662 A1 | 10/2015 | Miller | | |
| 2018/0373547 A1* | 12/2018 | Dawes | ............... | H04N 21/4788 |

(Continued)

FOREIGN PATENT DOCUMENTS

WO    WO-2019008320 A1 *    1/2019    ............. G06Q 10/06

OTHER PUBLICATIONS

Nguyen, et al., "Automatic Generation of a 3D Sign Language Avatar on AR Glasses Given 2D Videos of Human Signers", Proceedings of the 18th Biennial Machine Translation Summit, Virtual USA, 1st International Workshop on Automatic Translation for Signed and Spoken Languages, Aug. 16-20, 2021, pp. 71-81.

*Primary Examiner* — Qin Zhu
*Assistant Examiner* — Carissa A Jones
(74) *Attorney, Agent, or Firm* — Brake Hughes Bellermann LLP

(57) ABSTRACT

A method can include selecting, from at least a first avatar and a second avatar based on at least one attribute of a calendar event associated with a user, a session avatar, the first avatar being based on a first set of images of a user wearing a first outfit and the second avatar being based on a second set of images of the user wearing a second outfit, and presenting the session avatar during a videoconference, the presentation of the session avatar changing based on audio input received from the user during the videoconference.

22 Claims, 13 Drawing Sheets

(56) References Cited

U.S. PATENT DOCUMENTS

| | | |
|---|---|---|
| 2020/0202603 A1 | 6/2020 | Choi et al. |
| 2021/0090314 A1 | 3/2021 | Hussen Abdelaziz et al. |
| 2021/0104087 A1 | 4/2021 | Smith et al. |
| 2021/0358190 A1* | 11/2021 | Choi ................. G06T 19/20 |
| 2021/0405831 A1 | 12/2021 | Mourkogiannis et al. |

* cited by examiner

SELECTING AVATAR FOR VIDEOCONFERENCE

TECHNICAL FIELD

This description relates to videoconferencing.

BACKGROUND

Videoconferences facilitate remote meetings by enabling users to talk in a similar manner to a telephone conference, with the added benefit of viewing video of each other. At times, users may not be dressed appropriately for the videoconference.

SUMMARY

A computing system can generate and store multiple avatars for a user. The avatars can present realistic images of the user's face, neck, and upper torso. The different avatars can have different outfits, sets of clothing, hairstyles, and/or accessories that are appropriate for different meetings. The computing system can select an avatar that is appropriate for a meeting based on metadata for a calendar event for the meeting, such as based on the time of day of the calendar event or the attendees or contact identifiers for the calendar event.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Disclosed implementations include a computing system that enables a user to generate various avatars and can select an appropriate avatar to represent a user during an event attended via videoconference. The avatar can change appearance during the videoconference, such as by representing mouth movements, to look as if the avatar is actually talking while the user is talking and providing video input. The computing system can select the avatar based on a determination of the type of event that the user will attend via videoconference, such as a business meeting, a casual meeting, or a virtual party.

The computing system can determine the type of event based on attributes of the event. The attributes of the event can include attributes of other attendees of the event (e.g., attributes describing other attendees, such as contact identifiers, email addresses, titles, relationship to the attendee, or contact type, etc.), a description of the event received from the user, a title of the event, a time of day of the event, and/or a day of the week, as non-limiting examples. In some examples, the user can provide a description of an avatar to the computing system, and the computing system can select the avatar based on the attributes of the event and the description of the avatar. During the event, which can be a videoconference, the computing system can stream video of the avatar, including audio of the user speaking. The avatar can be realistic, e.g., closely resembling video of an actual human speaking. The streaming of the video of the avatar, including the audio of the user speaking, can reduce the data transmission compared to live video of the user actually speaking. In some examples, at the beginning of the videoconference, the computing system can reduce data transmission by sending parameters to construct the avatar to a server hosting the videoconference and/or other electronic devices via which other participants are participating in the videoconference, and the computing system can send, to the server and/or other computing systems, changes to the avatar based on audio input received from the user. Further to the descriptions above, a user is provided with controls allowing the user to make an election as to both if and when parameters are sent to the server, if, when, and how much of a videoconference is captured for training an avatar selection engine, etc. and if, when, and what attributes of an event are associated with an avatar. In addition, certain data may be treated in one or more ways before it is stored or used, so that user information is removed. Thus, the user may have control over what information is collected about the user, how that information is used, and what information is provided to the user.

Figure 1A:
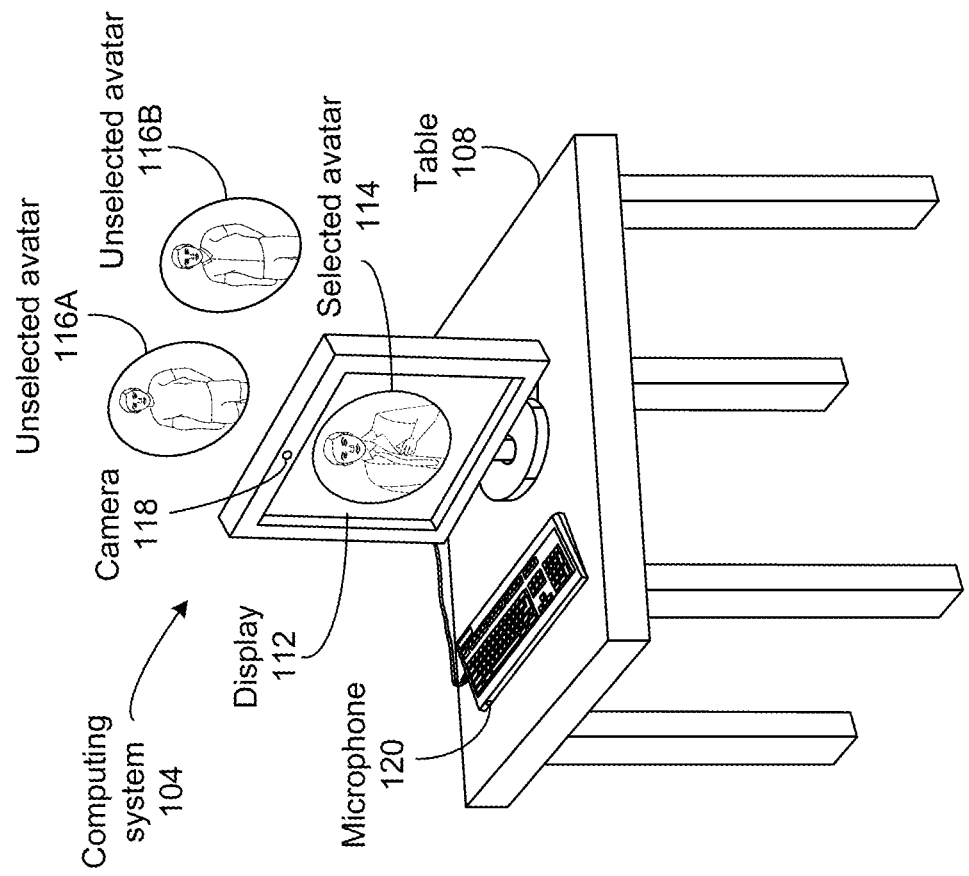
FIG. 1A shows a computing system selecting an avatar to represent a user during a videoconference according to an example implementation.
Figure 1A:
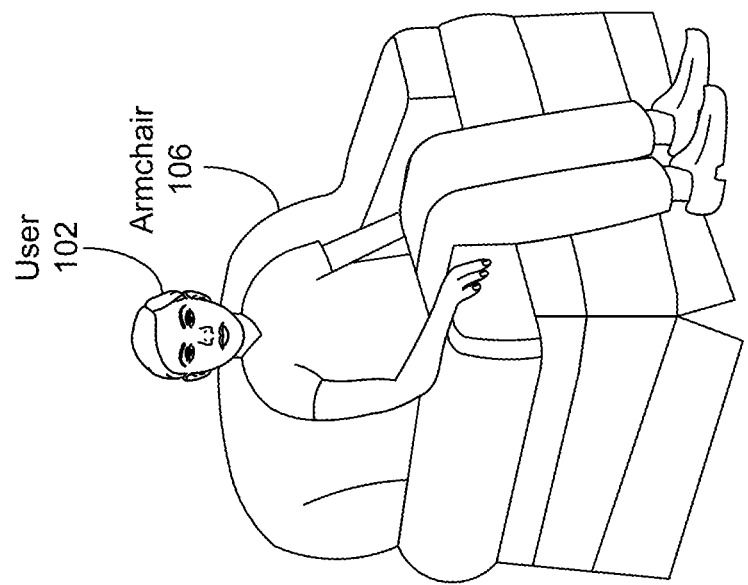

FIG. 1A shows a computing system 104 selecting an avatar 114 to represent a user 102 during a videoconference according to an example implementation. The computing system 104 can select the avatar 114 from among multiple avatars, including the two unselected avatars 116A, 116B shown in FIG. 1A. The computing system 104 can select the avatar 114 that will most appropriately represent the user 102 for a calendar event that the user 102 will attend by videoconference. In the example shown in FIG. 1A, the calendar event is a business meeting. In response to determining that the calendar event is a business meeting, the computing system 104 selects the avatar 114 that shows the user 102 in business attire. The avatar 114 can be considered a session avatar, based on which the computing system 104 will render video for the session of the meeting and/or videoconference.

In the example shown in FIG. 1A, the user 102 is casually sitting or laying on an armchair 106. Sitting or slouching on the armchair 106 may not appear appropriate for a business meeting. However, the computing system 104, which can be resting on a table 108 in front of the user 102, can generate a video representation of the user 102 for the videoconference. In some examples, the user 102 can request the computing system 104 to generate the video representation of the user 102. In some examples, the computing system 104 can request the user 102 to select whether the computing system 104 should generate a video representation of the user 102 or present the actual video of the user 102 at the beginning of the videoconference. In some examples, the computing system 104 can generate the video representation of the user 102 by default, and give the user 102 the option to override the default by requesting the computing system 104 to present the actual video of the user 102. The computing system 104 can present the selected avatar 114 to the user 102 via a display 112 included in the computing system 104, and can send the selected avatar 114 to other computing systems for viewing by other participants in the videoconference. In some examples, the user 102 can select a different avatar, such as one of the unselected avatars 116A, 116B, instead of the selected avatar 114 that was recommended by the computing system 104. The computing system 104 can generate the video representation of the user 102 with clothing, outfit, and/or attire, as well as an appropriate posture and/or background, based on the selected avatar 114. For other types of meetings, such as casual videoconferences with friends or virtual parties, the computing system 104 can select other avatars such as the unselected avatars 116A, 116B.

The computing system 104 can include a microphone 120. The computing system 104 can receive audio input via the microphone 120, such as the user's 102 voice while the user 102 is speaking during the videoconference. The computing system 104 can modify and/or generate the video representation of the user 102 based on the audio input. For example, while the user 102 is talking, the computing system 104 can cause the mouth of the selected avatar 114 to move within the generated video representation of the user 102. The computing system 104 can cause the shape of the mouth of the selected avatar 114 to change based on the sounds the user 102 makes, such as opening the mouth when making a long, "O'" sound, or puckering the lips when making a "P" sound.

In some examples, the computing system 104 can include a camera 118. The camera 118 can capture images, such as images of the user 102. In some examples, the camera 118 can capture a set of images of the user 102, based on which the computing system 104 can generate an avatar 114, 116A, 116B. In some implementations, the camera 118 can capture the set of images during a dedicated session, such as a photo session and/or video recording session for the purpose of generating an avatar. In some implementations, the camera 118 can capture the set of images during a videoconference. These are given as non-limiting examples.

Figure 1B:
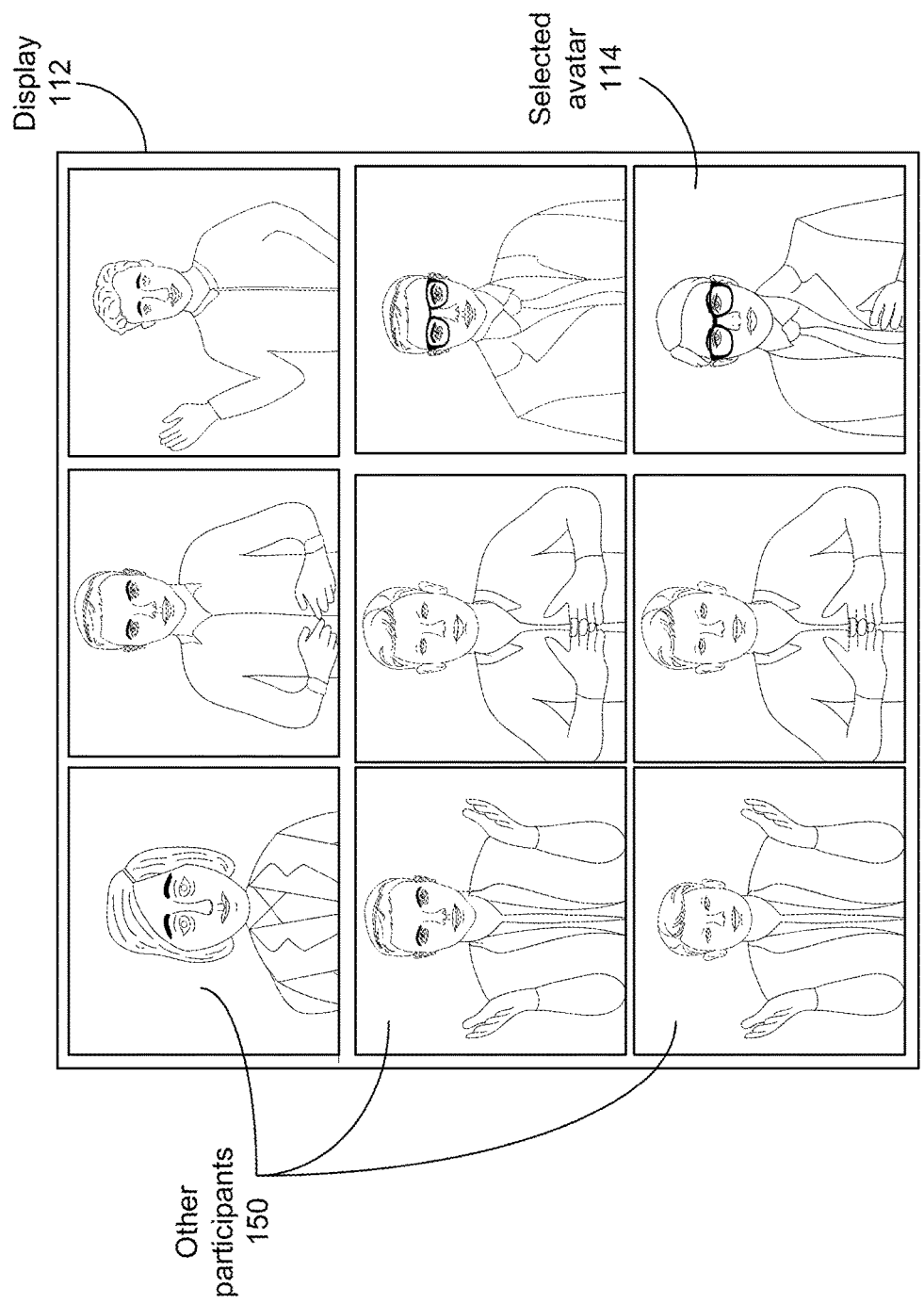
FIG. 1B shows a display of the computing system representing the user with the selected avatar during the videoconference according to an example implementation.

FIG. 1B shows the display 112 of the computing system 104 representing the user 102 (not shown in FIG. 1B) with the selected avatar 114 during the videoconference according to an example implementation. The display 112 can show the selected avatar 114, which can move and/or change appearance to correspond to the user's 102 speech, to show the user 102 how other participants of the videoconference see the user 102. The display 112 can also present and/or display other participants 150 of the videoconference. The computing system 104 can also generate audio output based on speech of users represented by the other participants 150, so that all participants in the videoconference, including the user 102, can hear each other and talk to each other.

Figure 2A:
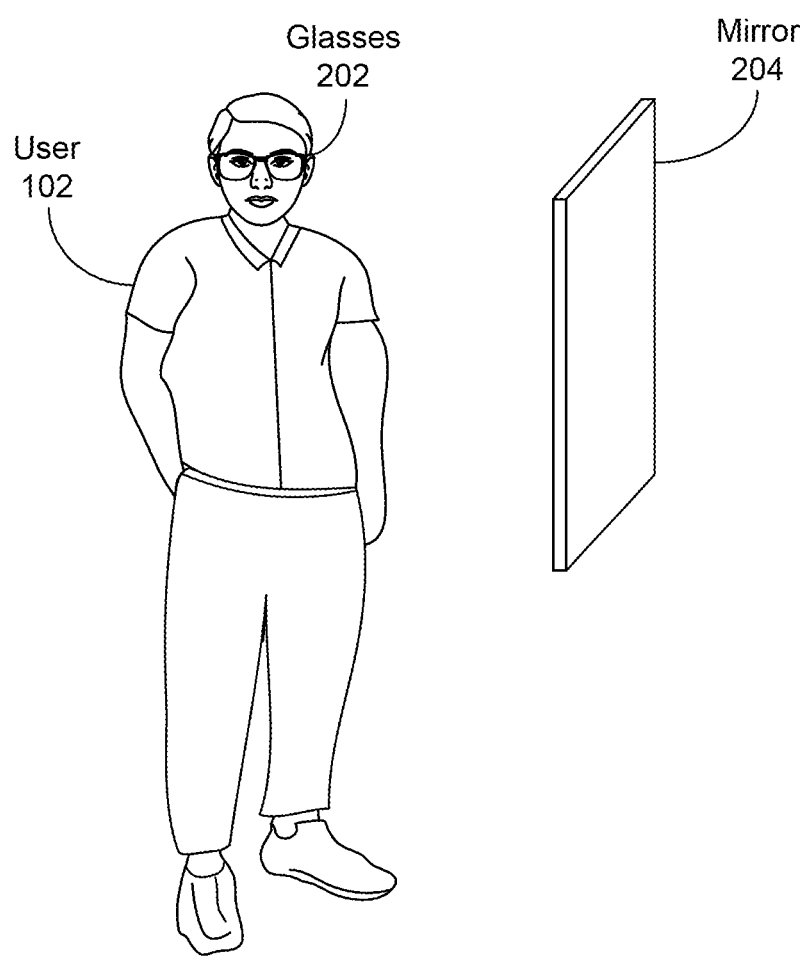
FIG. 2A shows the user wearing glasses and a first outfit in front of a mirror to generate a first set of photographs according to an example implementation.
Figure 2B:
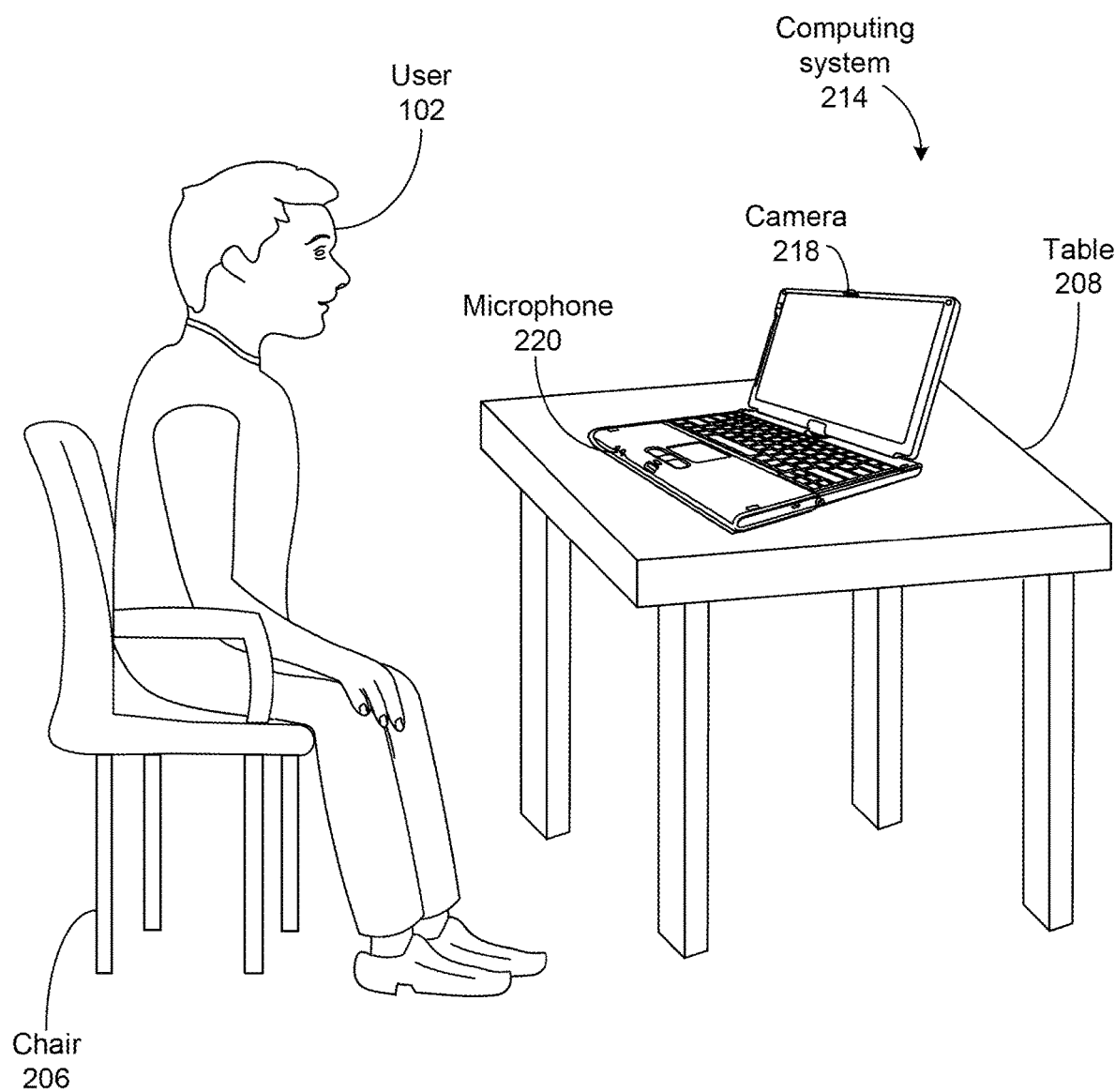
FIG. 2B shows the user wearing a second outfit in front of a computing system to generate a second set of photographs according to an example implementation.
Figure 2C:
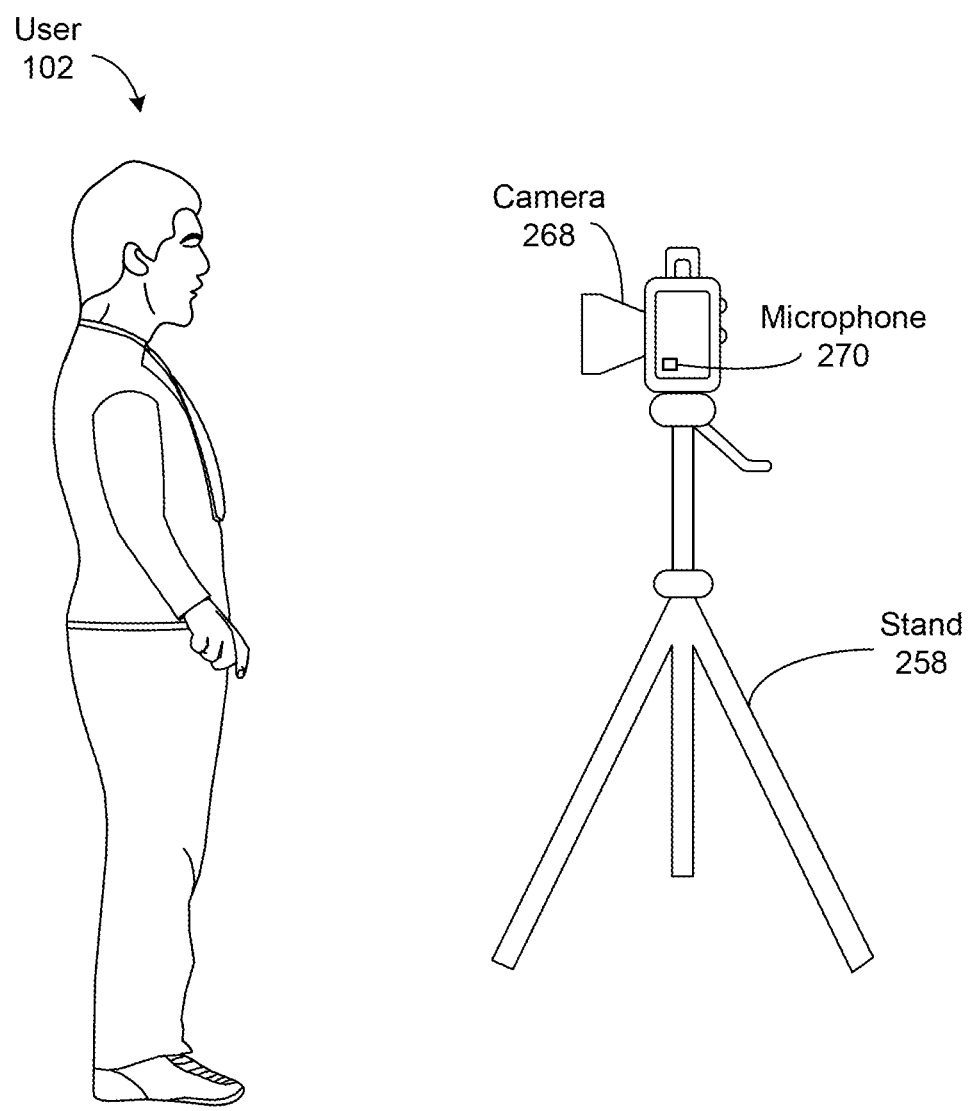
FIG. 2C shows the user wearing a third outfit in front of a camera to generate a third set of photographs according to an example implementation.

The computing system 104 can train neural rendering models based on sets of photographs and/or images of the user 102 (as described herein, photographs can be considered to include images). Each set of photographs can include multiple photographs of the user in a single outfit. In some examples, the computing system 104 can capture the multiple photographs while the user 102 is speaking predetermined words, such as text from a script, and/or making predetermined facial expressions, to determine facial and mouth features of the user 102 when the user is pronouncing specific sounds. Examples of capturing sets of photographs, based on which the computing system 104 can train a neural rendering model to generate an avatar, are shown in FIGS. 2A, 2B, and 2C. In some examples, a classifier, such as a binary classifier, can determine whether the user 102 is wearing the same outfit in a given photograph as in a previous set of photographs.

FIG. 2A shows the user 102 wearing glasses 202 and a first outfit in front of a mirror 204 to generate a first set of photographs according to an example implementation. The glasses 202 can include augmented reality and/or virtual reality glasses with a processor, memory, and camera to capture pictures of the user 102 in the mirror 204. In this example, the user 102 is wearing casual clothes, and the glasses capture a first set of photographs of the user 102 wearing a first outfit (casual clothes) based on which the computing system 104 generate a first avatar.

While the first set of photographs is captured, the user 102 can speak predetermined words, such as by reading from a script. In some implementations, the script may be displayed by the glasses 202. The camera included in the glasses 202 can capture images of the user 102 speaking the predetermined words, based on which the computing system 104 can modify facial features (such as positions and/or shapes of the mouth) of the selected avatar while audio input received by the microphone 120 captures specific sounds spoken by the user 102.

FIG. 2B shows the user wearing a second outfit in front of a computing system to generate a second set of photographs according to an example implementation. In this example, the user 102 is sitting on a chair 206 wearing a second outfit, which can be party clothes, and the computing system 214 is resting on a table 208. The computing system 214 can be the same or a different computing system than the computing system 104. The computing system 214 can include a camera 218, and can capture a second set of photographs of the user wearing the second outfit, based on which either of the computing systems 104, 214 generate a second avatar. While the second set of photographs is captured, the user 102 can speak predetermined words, which can be captured by a microphone 220 include in the computing system 214, as described above with respect to FIG. 2A.

FIG. 2C shows the user 102 wearing a third outfit in front of a camera 268 to generate a third set of photographs according to an example implementation. In this example, the user 102 can be wearing a third outfit, such as business attire including a dress shirt and tie. In this example, the camera 268 is supported by a stand 258, which can include a tripod. While the camera 268 captures the third set of photographs, the user 102 can speak predetermined words that are captured by a microphone 270 included in the camera 268, as described above with respect to FIG. 2A.

Figure 3:
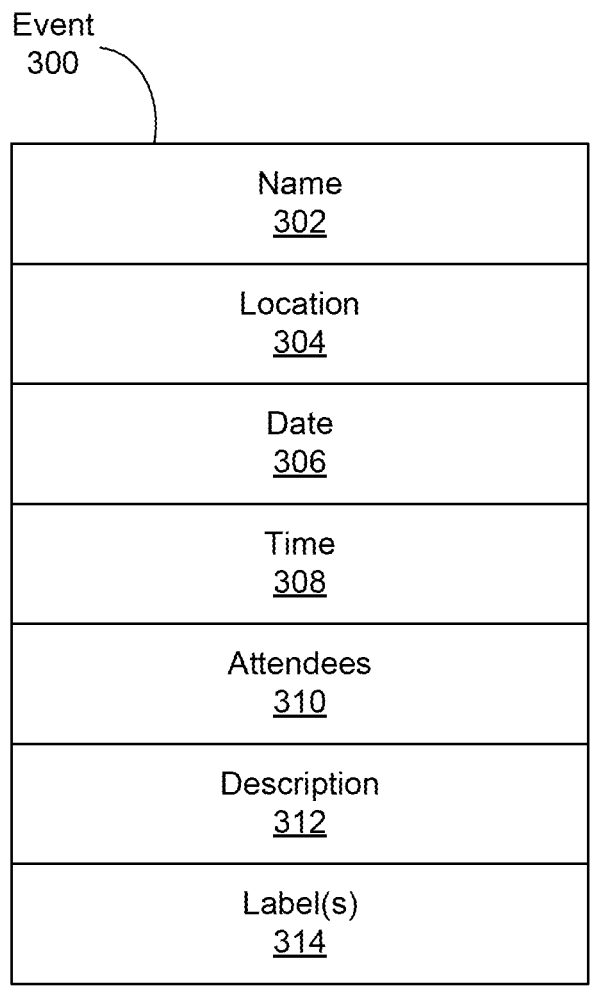
FIG. 3 is a block diagram of an event that the user will attend via videoconference according to an example implementation.

FIG. 3 is a block diagram of an event 300 that the user 102 will attend via videoconference according to an example implementation. The event 300, which can be considered a calendar event, can be associated with the user 102, and/or can be stored in a calendar application in association with the user 102. The event 300 can include multiple attributes. Based on one or more of the attributes the computing system 104 can select the avatar 114 to represent the user during the videoconference. The attributes of the event 300 can include any combination of one or more of a name 302 (i.e., title) of the event, a location 304 (which can include a universal resource locator) of the event 300, a date 306 of the event 300, a time 308 of the event 300, the names or contact identifiers (such as proper names including first names, last names, and optionally middle names, email addresses, and/or usernames) of one or more attendees 310 of the event 300 (other than and/or in addition to the user 102), a description of the event 300 that can be included in the event 300 generated by a person who created the event 300 and/or added to the event 300 by the user, and/or one or more labels 314 of the event 300. Labels 314 can indicate a type of the event, such as a business meeting, a casual meeting, or a party, as non-limiting examples.

Figure 4:
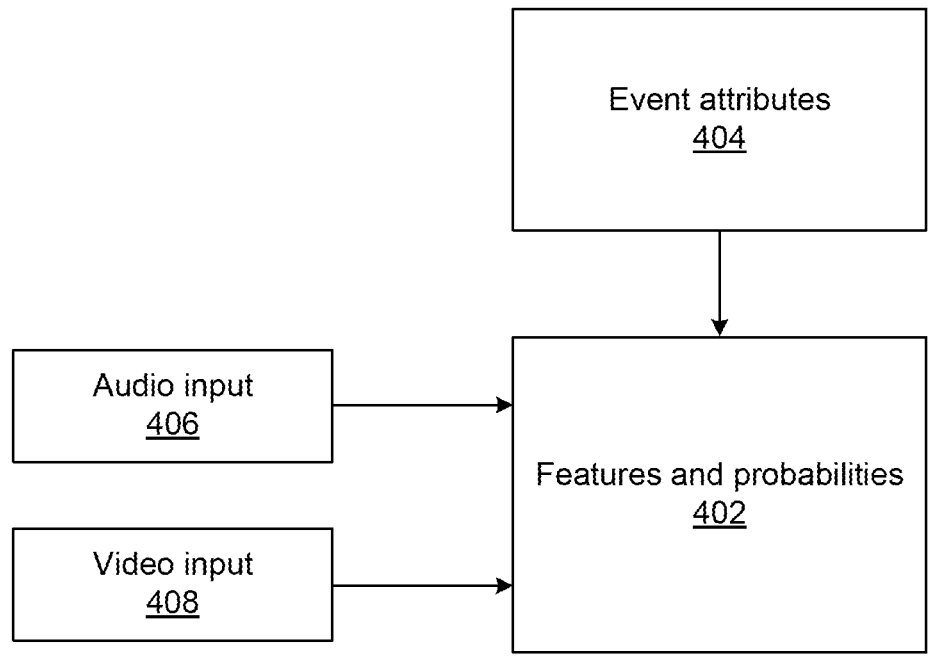
FIG. 4 is a flow diagram showing a training process for an engine to recommend an avatar for a videoconference according to an example implementation.

FIG. 4 is a flow diagram showing a training process for an engine to recommend an avatar for a videoconference according to an example implementation. A computing system, such as the computing system 104 and/or a computing system in communication with the computing system 104, can be trained to predict an avatar to use for a particular event. The prediction can be based on probabilities calculated for avatars. The training can cause the engine to consider inputs, including attributes of the calendar event 300 (event attributes 404), and/or input received by the computing system 104, such as audio input 406 and/or video input 408, to determine an avatar to use during a teleconference. In some implementations, the computing system may determine an avatar to use for an event based on likelihoods of that event falling into classifications associated with the avatar (e.g., the event being a member of a category associated with the avatar). The classifications can include business meetings, casual meetings, or virtual parties, as non-limiting examples.

The computing system can receive event attributes 404 of calendar events 300 as inputs. The event attributes can include times 308 of the events 300, types of participants and/or attendees 310 for the events 300 such as business associates or casual acquaintances (which can be based on contact identifiers such as email addresses included in the calendar event 300), the names 302 of the events 300, the locations 304 of the events 300, the dates 306 of the events 300, the descriptions 312 of the events 300, and/or labels 314 of the events 300. The computing system can also receive as input any descriptions of a particular event 300 from sources other than the event 300, such as a calendar associated with the user 102 and/or emails sent and/or received by the user 102 that describe and/or refer to the event 300. The computing system can receive the attributes as features, i.e., measurable pieces of data that can be used for analysis. The attributes and/or features can include vectorized text embeddings generated by the computing system by a neural network (e.g., a word2vec embedding or a similar embedding). When a user selects an avatar for a particular event, the event attributes for that meeting can be associated with the avatar. In some examples, the computing system 104 can be trained to select the avatar for events with similar attributes.

In some examples, the computing system 104 can train a classification algorithm to determine the category or type (such as business meeting or casual meeting) of the event 300 that correspond to the label 314 that identifies the avatar for the event 300.

In some examples, the classification algorithm can include a machine learning algorithm. In some examples, the machine learning algorithm can be trained based on previous avatar selections by the user 102, such as the user previously selecting an avatar labeled as a business avatar when the event 300 includes a specific word in the name 302 or description or includes a particular attendee 310. Affinity scores for each avatar for each event type and/or contact could be learned based on data collected over time.

The computing system can also capture audio input 406 during the videoconference, such as via the microphone 120. The audio input 406 can include a tensor and/or vector, such as a 512 by 1 tensor (e.g., a vector), of a spectrum of audio frequency. In some examples, training can be based on tones of voice, dialects, and/or words that the user 102 uses depending on whom the user 102 is speaking with and/or depending on what type of meeting is occurring. In some examples, the computing system 104 can be trained to select the avatar based on the tone of voice, dialect, and/or word choices of the user 102.

The computing system can also capture video input 408 during the video conference, such as via the camera 118. The video input 408 can include an array of image tensors, such as a 1,280 by 720 array of image tensors. The video input can indicate a type of outfit worn by the user during previous videoconferences. The computing system 104 could have performed image classification on the video input received during previous videoconferences to determine types of outfits worn by the user 102 during the previous videoconferences, and select an avatar (502) with a similar outfit as the user wore during the previous videoconferences.

The computing system can also capture and/or determine facial landmarks of the user 102 based on the video input 408. The computing system can capture and/or determine the facial landmarks by a face detector that applies a feature extraction network, such as Mediapipe FaceMesh, to predict coordinates in three dimensions. In some examples, the computing system 104 can train the machine learning algorithm based on video input (408) received during previous videoconferences. The video input can indicate a type of outfit worn by the user during previous videoconferences. The computing system 104 could have performed image classification on the video input received during previous videoconferences to determine types of outfits worn by the user 102 during the previous videoconferences, and train the classification algorithm to select an avatar with a similar outfit as the user wore during the previous videoconferences.

Based on the event attributes, audio input 406, and video input 408, the computing system 104 can determine features and probabilities (402). The features and probabilities (402) can associate n features, $<f_1, f_2, \ldots, f_n>$, such as the event attributes (404), audio input (406), and/or video input (408), with regression probabilities, $<P_1, P_2, \ldots, P_m>$ for m avatars. The n features can be associated with the m avatars based on a multivariate regression algorithm, a decision tree algorithm, nearest-neighbor classifier, Bayesian classifier, or a neural network, as non-limiting examples. The features and probabilities (402) can comprise an avatar selection model.

Figure 5:
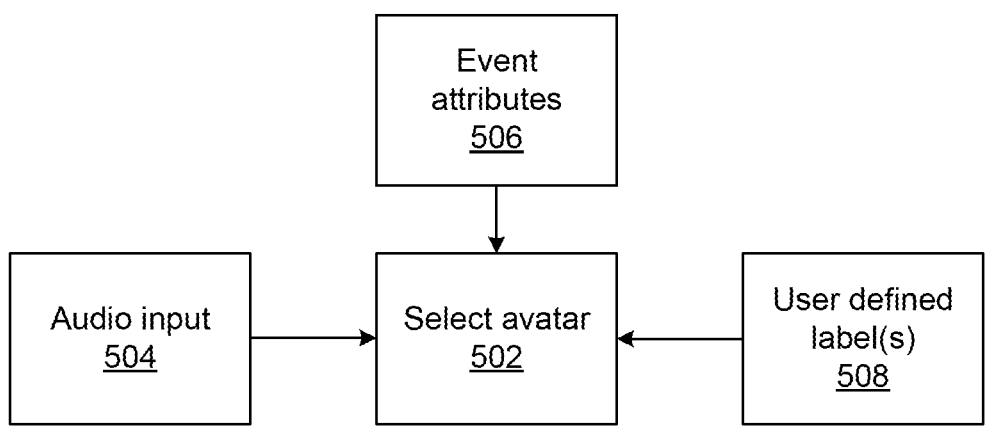
FIG. 5 is a flow diagram showing selection of an avatar for a videoconference according to an example implementation.

FIG. 5 is a flow diagram showing selection of an avatar (502) for a videoconference according to an example implementation. The computing system 104 can select the avatar (502) either before a scheduled calendar event 300, or during the videoconference scheduled by the event 300, based on multiple inputs. The inputs can include audio input (504), event attributes (506), and/or one or more user-defined labels (508), as non-limiting examples.

The computing system 104 can select the avatar (502) based on audio input (504) received before and/or during the videoconference. The avatar that is selected at (502) can be considered a session avatar that the computing system will animate for the videoconference session. In some examples, the user 102 will speak in a different tone of voice, with a different dialect, and/or use different words depending on whom the user 102 is speaking with and/or depending on what type of meeting is occurring. In some examples, the computing system 104 can select the avatar (502) based on the tone of voice, dialect, and/or word choices of the user 102.

The computing system 104 can select the avatar (502) based on event attributes (506) of the calendar event. The computing system 104 can select the avatar (502) based on, for example, the name 302 of the event 300 (if the name 302 indicates a business matter then the computing system 104 can select an avatar with business attire), the time 308 of the event 300 (if the time 308 is during business hours then the computing system 104 can select an avatar with business attire, whereas if the time 308 is during the evening on a weekend then the computing system 104 can select an avatar with party attire), or the attendees 310 of the event 300 (if the attendees are business contacts then the computing system 104 can select an avatar with business attire, whereas if the attendees are friend contacts then the computing system 104 can select an avatar with casual or party attire), as non-limiting examples.

The computing system 104 can select the avatar (502) based on one or more user-defined labels (508). In some examples, the user 102 can define and/or apply the user-defined labels to the event 300, such as the label(s) 314 that identifies a category or type for the event 300 (such as business, casual, or party), or a label 314 that identifies an avatar for the event 300. In some examples, the user 102 can define and/or apply the user-defined labels to the avatars, such as labeling and/or defining specific avatars as appropriate for business meetings, casual meetings, or virtual parties. In this example, the computing system 104 can determine which of the labeled avatars (such as a first avatar and a second avatar) corresponds to the event 300 and/or meeting based on the audio input (504) and/or event attributes (506).

In some examples, the computing system 104 can execute a classification algorithm to determine the category or type (such as business meeting or casual meeting) of the event 300 that corresponds to the label 314 that identifies the avatar for the event 300. In some examples, the classification algorithm can include a machine learning algorithm, as discussed above with regard to FIG. 4.

In some examples, descriptions and/or labels of the avatars received from the user can include contact identifiers. The contact identifiers can indicate contacts and/or attendees of events or videoconferences for whom the user 102 desires to present the avatar. The user 102 could, for example, add the contact identifier of a business acquaintance to a first avatar in which the user 102 is wearing business attire, and add the contact identifier of a friend to a second avatar in which the user 102 is wearing a concert t-shirt purchased at a concert that the user 102 attended with the friend.

In some examples, the computing system 104 can select the avatar (502) based on activity of the user 102 before and/or during the calendar event and/or videoconference. The computing system 104 can select the avatar (502) based on activity of the user 102 and any combination of the audio input (504), event attributers (506), and/or user-defined label(s) 508. The activity of the user 102 can include web browsing activities or interacting with documents and/or applications. For example, if the user 102 is browsing web pages that are business related, and/or interacting with documents or applications that are business related (such as a word processing application or spreadsheet application), then the computing system 104 can determine that the user 102 is engaging in business activities and select an avatar (502) that is appropriate for a business meeting. In another example, if the user 102 is playing and/or interacting with a gaming application, then the computing system 104 can determine that the user 102 is about to meet with friends and select an avatar (502) that is appropriate for a casual meeting with friends.

In some examples, the computing system 104 can select the avatar (502) based on remote audio input received during the videoconference. The remote audio input can include attendees other than the user 102 speaking during the videoconference. The computing system 104 can recognize voices of attendees based on the remote audio input and/or words or topics discussed based on the remote audio input. The computing system 104 can select the avatar (502) based on the recognized attendees and/or words or topics based on the remote audio input.

In some examples, the computing system 104 can select the avatar (502) based on a combination of the attributes/features described above. For example, as discussed with regard to FIG. 4, the system can provide a set of features to a machine-learning algorithm trained to provide a most likely avatar to use for the event given the set of features as input. The most likely avatar is an avatar with a highest probability given the features. In some implementations, the probability for the most likely avatar must satisfy a threshold to be selected. In some implementations, if two or more avatars have probabilities within a predetermined range of each other, the system 104 may present the two or more avatars to the user for selection. Selection of the user can be used to further train the machine-learning algorithm.

In some examples, selecting the avatar (502) can include selecting a recommended avatar, and presenting the recommended avatar to the user. If the computing system 104 receives an indication of approval (such as the user 102 clicking on a button that says, "Yes," or audibly saying, "Yes") of the recommended avatar from the user 102, then the computing system 104 can select and present the recommended avatar during the videoconference. If the computing system 104 does not receive an indication of approval of the recommended avatar from the user 102, and/or receives an indication of disapproval from the user 102, then the computing system 104 can select and recommend a different avatar, until receiving an indication of approval of a recommended avatar.

Figure 6:
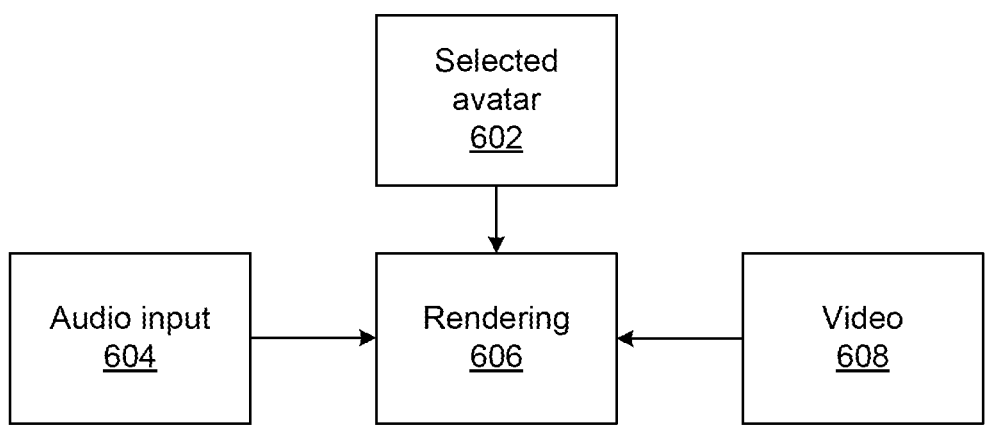
FIG. 6 is a flow diagram showing generation of video for a videoconference based on a selected avatar and received audio input according to an example implementation.

FIG. 6 is a flow diagram showing generation of video (608) for a videoconference based on a selected avatar (602) and received audio input (604) according to an example implementation. The computing system 104 can perform rendering of video (608) (including audio) based on the selected avatar 114 (602) and audio input (604). Audio input (604) can include words spoken by the user 102.

The rendering (606) can modify and/or animate the selected avatar (602) based on the audio input (604). The selected avatar (602) can also be considered a session avatar based on which the computing system will render the video (608) for the session of the videoconference. The rendering (606) can generate video (608) in which the face, including the mouth, of the selected avatar 114 moves when the audio input (604) indicates that the user 102 spoke words, so that the avatar 114 displayed in the video (608) will appear to be speaking at the same time as the user 102. The video (608) can present and/or animate the selected avatar (602) and/or session avatar. The video (608) can modify and/or change the presentation of the selected avatar (602) and/or session avatar based on the audio input (604), such as by including mouth movements that are based on the sounds spoken by the user 102 in the audio input (604). The modification and/or changing of the presentation of the selected avatar (602) and/or session avatar based on the audio input (604) can cause the avatar 114 to appear to be speaking the same words as the user 102. The video (608) can include the audio input (604), so that persons participating in the videoconference with the user 102 will hear the words spoken by the user 102 while seeing the avatar 114 appear to speak the words that were spoken by the user 102.

In some examples, the computing system 104 can generate a transition animation in response to a change of the avatar 114, 116A, 116B and/or outfit. The change of the avatar 114, 116A, 116B and/or outfit can be in response to the user selecting a different avatar 114, 116A, 116B and/or outfit, and/or in response to the computing system 104 changing the avatar 114, 116A, 116B and/or outfit automatically and/or without user instruction. The transition animation can include the new avatar 114, 116A, 116B moving into the area displayed by the display 112 while the old avatar 114, 116A, 116B moves out of the area displayed by the display 112, the new avatar 114, 116A, 116B fading into the area displayed by the display 112 while the old avatar 114, 116A, 116B fades out of the area displayed by the display 112, the new avatar 114, 116A, 116B becoming deblurred while the old avatar 114, 116A, 116B becomes blurred, and/or three-dimensional wrapping from opposite ends of the display 112, as non-limiting examples.

Figure 7:
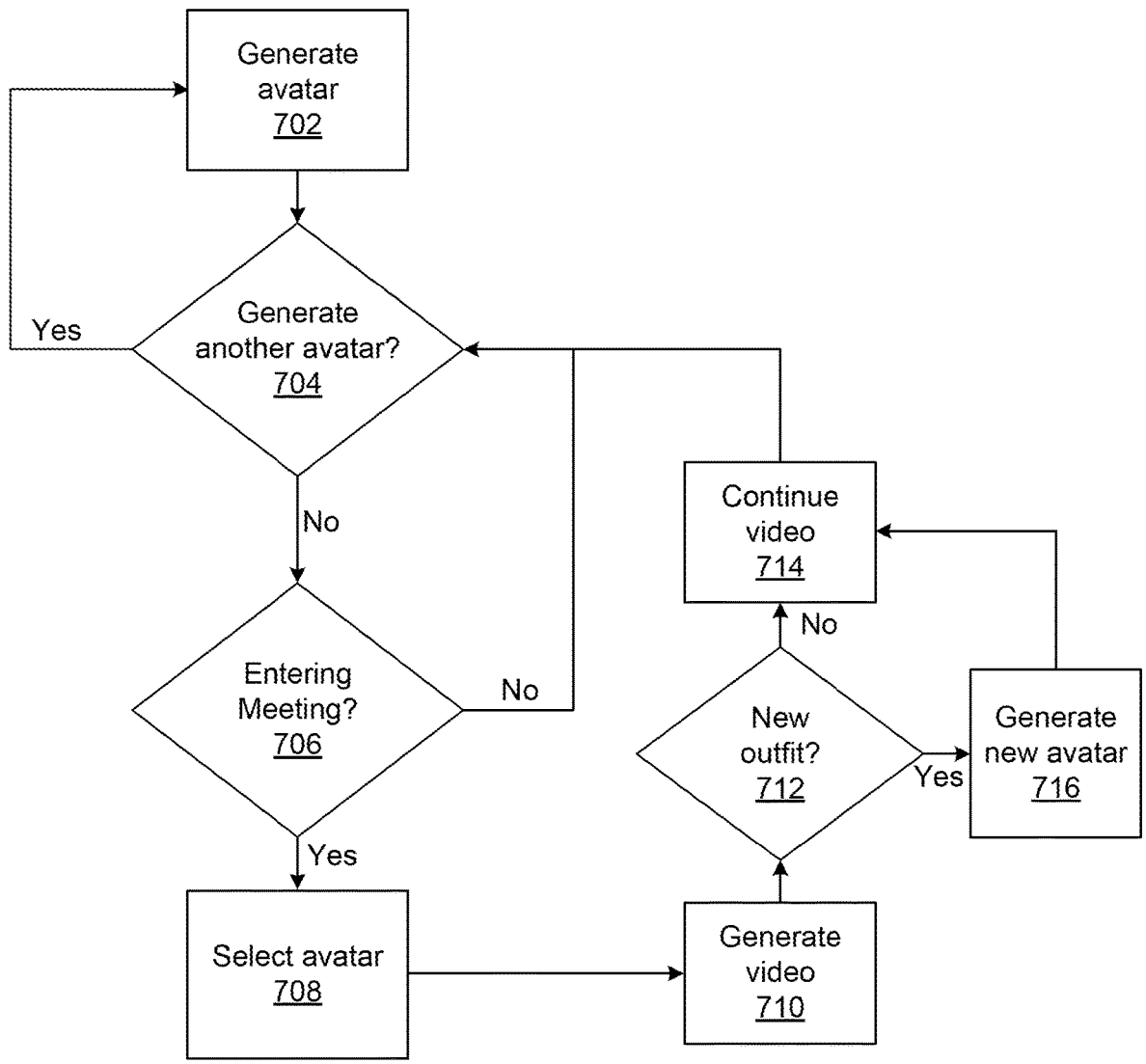
FIG. 7 is a flowchart showing generation and use of an avatar for a videoconference according to an example implementation.

FIG. 7 is a flowchart showing generation and use of an avatar 114 for a videoconference according to an example implementation. The computing system 104 can generate an avatar (702). The computing system 104 can generate the avatar (702) by capturing, and/or receiving, a set of photographs of the user 102 in a particular outfit and generating landmarks and/or facial features, as described above with respect to FIGS. 2A, 2B, 2C, 4, and 5.

In some examples, during or after the generation of the avatar (702), the computing system 104 can ask, and receive answers from the user 102 to, questions about the avatar, such as whom the user 102 would like to meet while wearing the outfit worn during generation of the avatar, and/or what type of event the user 102 would like to attend while wearing the outfit worn during generation of the avatar. The computing system 104 can store the answers to the questions in association with the generated avatar. The computing system 104 can also store selections of avatars, and the context of the selections (such as attributes of events 300 when the user selected a particular avatar), in association with the avatars, thereby improving the accuracy of the selections and/or recommendations of the avatars.

The computing system 104 can determine whether to generate another avatar (704). The computing system 104 can determine whether to generate another avatar (704) based, for example, on input from a user 102 indicating whether the user 102 wishes to generate another avatar with a different outfit than previous avatars. If the computing system 104 determines that the computing system 104 should generate another avatar, then the computing system 104 will generate another avatar (702).

If the computing system 104 determines that the computing system 104 is not and/or should not generate another avatar, such as after the computing system 104 is finished generating avatars and/or not in an avatar-generating mode, then the computing system 104 can determine whether the user 102 is entering a meeting (706) and/or whether a meeting (or calendar event) is beginning. If the computing system 104 determines that the user 102 is not entering a meeting, then the computing system 104 can determine whether the computing system 104 should generate another avatar (704).

If the computing system 104 determines that the user 102 is entering a meeting, and/or that a meeting (or calendar event) is beginning, then the computing system 104 can select an avatar (708). The avatar that is selected at (708) can be considered a session avatar. The computing system 104 can select the avatar (708) based on any combination of audio input (504), event attributes (506), and/or user-defined labels (508), as described above.

After selecting the avatar (708), the computing system 104 can generate the video (710). The computing system 104 can generate the video (710) based on the selected avatar (602) and audio input (604) as described above. The video can be a combination of audio based on audio input received from the user and visual output based on the avatar and received video input.

While generating the video (710), the computing system 104 can determine whether the user 102 is wearing a new outfit (712). In some examples, the computing system 104 can determine whether the user 102 is wearing a new outfit (712) by comparing the clothing and/or attire worn by the user 102 during the videoconference to the outfits in avatars that have been generated and/or outfits in the sets of photographs based on which the avatars were generated. In some examples, the computing system 104 can execute an outfit classifier of each existing avatar to determine if the user's current outfit is the same or different than the outfits in avatars that have already been generated. In some examples, if the outfit that the user 102 is currently wearing matches the outfit of an avatar that has already been generated, the computing system 104 can capture photographs of the user to improve the avatar that has already been generated and has an outfit that matches the outfit that the user 102 is currently wearing, while continuing to generate the video (714).

If the comparison results in a similarity threshold not being met, then the computing system 104 can generate a new avatar (716). The computing system 104 can generate the new avatar (716) by capturing a set of photographs of the user during the videoconference. The computing system 104 can generate the new avatar (716) based on the captured photographs either while continuing to generate the video (714) or at a later time (such as at (704)) to reduce processing load. In some examples, the computing system 104 can continue generating the video (714) based on the newly-generated avatar. In some examples, the computing system 104 can save the newly-generated avatar for a later meeting and/or videoconference. If the computing system 104 determines that the user 102 is not wearing a new outfit, such as based on the comparison resulting in the similarity threshold being met, then the computing system 104 can continue generating the video (714).

Figure 8:
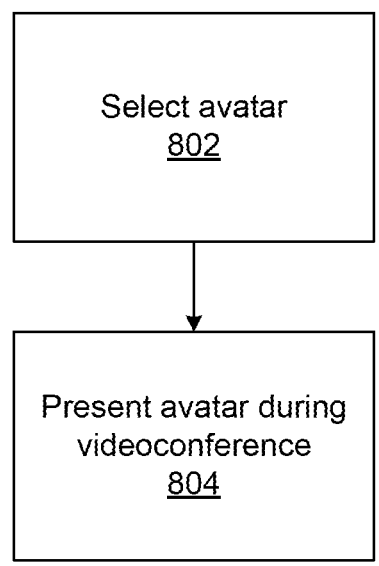
FIG. 8 is a flowchart showing a method performed by a computing system according to an example implementation.

FIG. 8 is a flowchart showing a method performed by the computing system according to an example implementation. The method can include selecting, from at least a first avatar and a second avatar based on at least one attribute of a calendar event associated with a user, a session avatar, the first avatar being based on a first set of images of a user wearing a first outfit and the second avatar being based on a second set of images of the user wearing a second outfit (802). The method can include presenting the session avatar during a videoconference, the presentation of the session avatar changing based on audio input received from the user during the videoconference (804).

In some examples, the selection of the session avatar includes selecting the avatar based on the at least one attribute of the calendar event, a description of the first avatar received from the user, and a description of the second avatar received from the user.

In some examples, the description of the first avatar includes a contact identifier, and the at least one attribute of the calendar event includes the contact identifier.

In some examples, the first avatar is associated with a first category, the second avatar is associated with a second category, and the selection the session avatar includes determining, based on a classification algorithm, that the calendar event is a member of the first category.

In some examples, the classification algorithm includes a learning algorithm and is based on previous selections by the user of either the first avatar or the second avatar.

In some examples, the selection of the session avatar is based on the at least one attribute of the calendar event and activity of the user before the calendar event.

In some examples, the at least one attribute includes a description of the event received from the user.

In some examples, the at least one attribute includes an attendee of the calendar event other than the user.

In some examples, the at least one attribute includes a title of the calendar event.

In some examples, the at least one attribute includes a time of day of the calendar event.

In some examples, the selection of the session avatar includes selecting the avatar based on the at least one attribute of the calendar event and remote audio input received during the videoconference.

In some examples, the selection of the session avatar includes selecting the session avatar based on the at least one attribute of the calendar event and the audio input received from the user.

In some examples, the selection of the session avatar includes selecting the session avatar based on the at least one attribute of the calendar event and previous selections, by the user, or either the first avatar or the second avatar.

In some examples, the selection of the session avatar includes selecting the session avatar based on the at least one attribute of the calendar event and video input of the user received during previous videoconferences, the video input indicating a type of outfit worn by the user during the previous videoconferences.

In some examples, the selection of the session avatar includes selecting the avatar based on the at least one attribute of the calendar event and video input of the user received during the videoconference, the video input indicating a type of outfit worn by the user during the videoconference.

In some examples, the selection of the session avatar includes presenting the session avatar to the user based on the at least one attribute of the calendar event associated with the user, and receiving an indication of approval of the session avatar from the user.

In some examples, the method further includes capturing a third set of images of the user during the videoconference, and generating a third avatar based on the third set of images of the user.

Figure 9A:
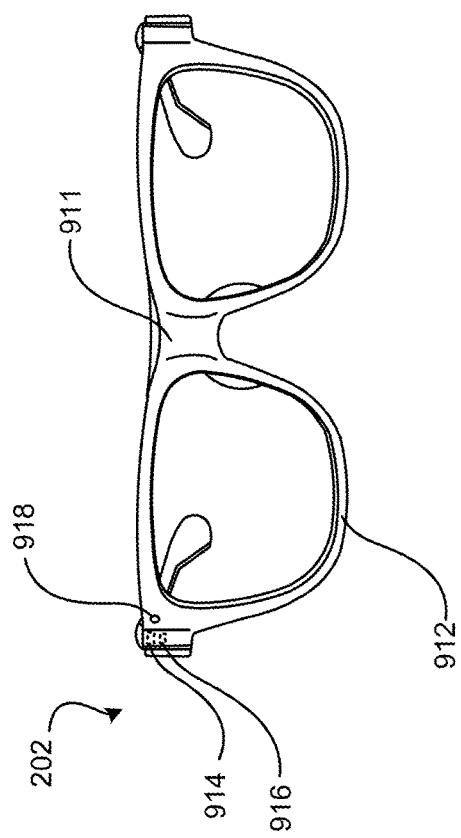
FIG. 9A is a front view.
Figure 9B:
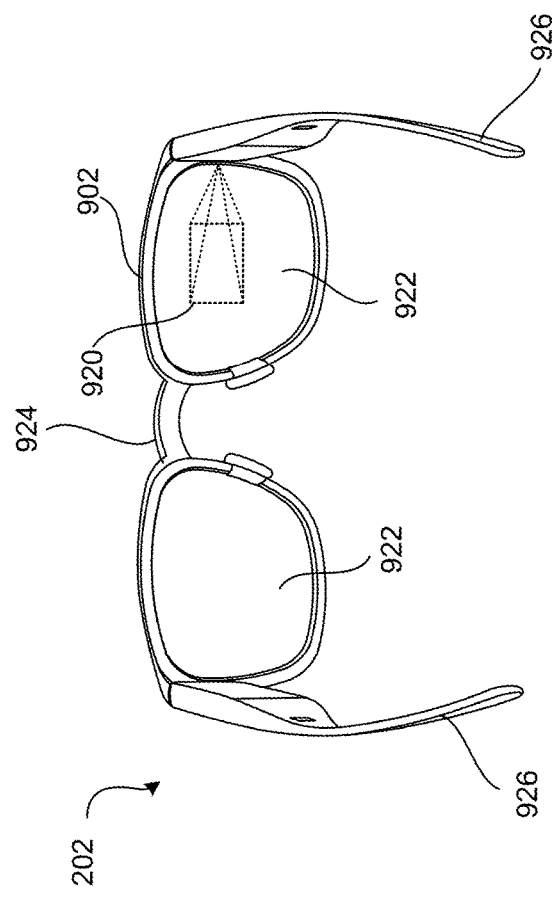
FIG. 9B is a rear view, of example glasses according to an example implementation.

FIG. 9A is a front view, and FIG. 9B is a rear view, of example glasses 202 according to an example implementation. The glasses 202 are an example of a head-mounted wearable device, such as smartglasses or augmented reality glasses, which can include display capability, eye-gaze tracking capability, and computing/processing capability.

The example glasses 202 include a frame 902. The frame 902 includes a front frame portion 911, and a pair of temple arm portions 926 rotatably coupled to the front frame portion 911 by respective hinge portions 914. The front frame portion 911 includes rim portions 912 surrounding respective optical portions in the form of lenses 922, with a bridge portion 924 connecting the rim portions 912. The temple arm portions 926 are coupled, for example, pivotably or rotatably coupled, to the front frame portion 911 at peripheral portions of the respective rim portions 912. In some examples, the lenses 922 are corrective/prescription lenses. In some examples, the lenses 922 are an optical material including glass and/or plastic portions that do not necessarily incorporate corrective/prescription parameters.

In some examples, the glasses include a display device 916 that can output visual content, for example, at an output coupler 920, so that the visual content is visible to the user. In the example shown in FIGS. 9A and 9B, the display device 916 is provided in one of the two temple arm portions 926, simply for purposes of discussion and illustration. Display devices 916 may be provided in each of the two temple arm portions 926 to provide for binocular output of content. In some examples, the display device 916 may be a see-through near eye display. In some examples, the display device 916 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 922, next to content (for example, digital images, user interface elements, virtual content, and the like) output by the display device 916. In some implementations, waveguide optics may be used to depict content on the display device 916.

In some examples, the glasses include one or more of an audio output device (such as, for example, one or more speakers), an illumination device, a sensing system, a control system, at least one processor, and an outward facing image sensor or camera 918. In some examples, the sensing system may include various sensing devices and the control system may include various control system devices including, for example, one or more processors operably coupled to the components of the control system. In some examples, the control system may include a communication module providing for communication and exchange of information between the glasses 202 and other external devices. In some examples, the glasses 202 includes a gaze tracking device to detect and track eye gaze direction and movement. Data captured by the gaze tracking device may be processed to detect and track gaze direction and movement as a user input. In the example shown in FIGS. 9A and 9B, the gaze tracking device is provided in one of the two temple arm portions 926, simply for purposes of discussion and illustration. In the example arrangement shown in FIGS. 9A and 9B, the gaze tracking device is provided in the same arm portion 926 as the display device 916, so that user eye gaze can be tracked not only with respect to objects in the physical environment, but also with respect to the content output for display by the display device 916. In some examples, gaze tracking devices may be provided in each of the two arm portions 926 to provide for gaze tracking of each of the two eyes of the user. In some examples, display devices 916 may be provided in each of the two temple arm portions 926 to provide for binocular display of visual content.

Figure 10:
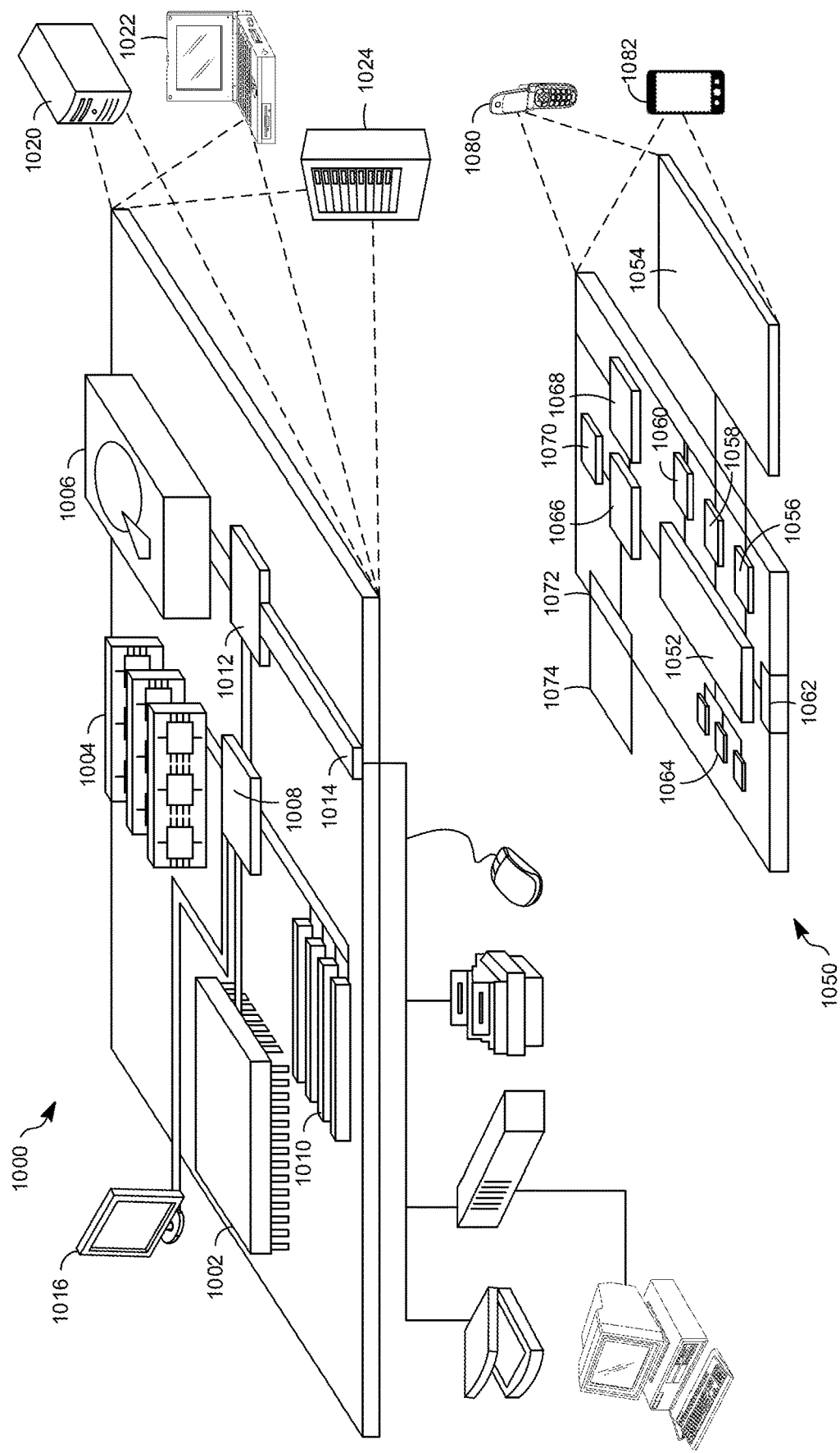
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. Either of the computing devices 1000, 1050 can be an example of the computing system 104. While the computing system 104 has been described as a single local computing system, the functions, methods, and/or techniques described herein can be performed by and/or distributed between any number of computing systems, including a local computing system, smartglasses, and/or a remote computing system such as a server. The components shown here, their connections and relationships, and their functions, are meant to be an example only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. The memory 1004 can include a non-transitory computer-readable storage medium comprising instructions stored thereon that, when executed by at least one processor such as the processor 1002, are configured to cause the computing device 1000 to perform any combination of methods, functions, and/or techniques described herein. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can include a non-transitory computer-readable storage medium comprising instructions stored thereon that, when executed by at least one processor such as the processor 1052, are configured to cause the computing device 1000 to perform any combination of methods, functions, and/or techniques described herein. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    storing an association between features for a plurality of avatars and probabilities for the plurality of avatars, the plurality of avatars including a first avatar that was generated based on a first set of images of a user wearing a first outfit and a second avatar that was generated based on a second set of images of the user wearing a second outfit, the features being based on at least one of the first set of images and the second set of images;
    selecting the first avatar as a session avatar based on video input and the association between the features and the probabilities, the second avatar being an unselected avatar; and
    presenting the session avatar during a videoconference.

2. The method of claim 1, wherein the selection of the session avatar is further based on at least one attribute of a calendar event, a description of the first avatar received from the user, and a description of the second avatar received from the user.

3. The method of claim 2, wherein:
    the description of the first avatar includes a contact identifier; and
    the at least one attribute of the calendar event includes the contact identifier.

4. The method of claim 1, wherein the selection is further based on a time of day of a calendar event.

5. The method of claim 1, wherein the selection of the session avatar is further based on at least one attribute of a calendar event associated with the videoconference.

6. The method of claim 1, wherein the selection of the session avatar is further based on audio input received from the user.

7. The method of claim 1, wherein the selection of the session avatar is further based on previous selections, by the user, of either the first avatar or the second avatar.

8. The method of claim 1, wherein the selection of the session avatar is further based on video input of the user received during previous videoconferences, the video input indicating a type of outfit worn by the user during the previous videoconferences.

9. The method of claim 1, wherein the video input indicates a type of outfit worn by the user during the videoconference.

10. The method of claim 1, wherein the selection of the session avatar includes:
    presenting the session avatar to the user; and
    receiving an indication of approval of the session avatar from the user.

11. The method of claim 1, further comprising:
    capturing a third set of images of the user during the videoconference; and
    storing a third avatar based on the third set of images of the user.

12. The method of claim 1, wherein the user was speaking predetermined words from a script as part of generating the first avatar.

13. The method of claim 1, wherein selecting the first avatar as the session avatar is further based on a tone of voice of the user.

14. The method of claim 1, further comprising:
    receiving audio input during presentation of the session avatar during the videoconference; and
    changing the session avatar to the second avatar based on features in the audio input.

15. The method of claim 1, wherein the features include facial landmarks.

16. The method of claim 1, wherein the association between the features and the probabilities are stored in a model.

17. A non-transitory computer-readable storage medium comprising instructions stored thereon that, when executed by at least one processor, are configured to cause a computing system to:
    store an association between features for a plurality of avatars and probabilities for the plurality of avatars, the plurality of avatars including a first avatar that was generated based on a first set of images of a user wearing a first outfit and a second avatar that was generated based on a second set of images of the user wearing a second outfit, the features being based on at least one of the first set of images and the second set of images;
    select the first avatar as a session avatar based on video input and the association between the features and the probabilities, the second avatar being unselected; and
    present the session avatar during a videoconference.

18. The non-transitory computer-readable storage medium of claim 17, wherein the selection of the session avatar is further based on at least one attribute of a calendar event, a description of the first avatar received from the user, and a description of the second avatar received from the user.

19. The non-transitory computer-readable storage medium of claim 17, wherein the selection of the session avatar is further based on an attendee of a calendar event other than the user.

20. A computing system comprising:
    at least one processor; and
    a non-transitory computer-readable storage medium comprising instructions stored thereon that, when executed by the at least one processor, are configured to cause the computing system to:
        store an association between features for a plurality of avatars and probabilities for the plurality of avatars, the plurality of avatars including a first avatar that was generated based on a first set of images of a user wearing a first outfit and a second avatar that was generated based on a second set of images of the user wearing a second outfit, the features being based on at least one of the first set of images and the second set of images;

select the first avatar as based on video input and the association between the features and the probabilities, the second avatar being an unselected avatar; and present the session avatar during a videoconference.

21. The computing system of claim 20, wherein the selection of the first avatar is further based on an attendee of a calendar event other than the user.

22. The computing system of claim 20, wherein the instructions are further configured to cause the computing system to:

change the session avatar to the second avatar based on features in audio input received during presentation of the session avatar during the videoconference.

* * * * *

UNITED STATES PATENT AND TRADEMARK OFFICE
CERTIFICATE OF CORRECTION

PATENT NO. : 12,317,002 B2
APPLICATION NO. : 18/047420
DATED : May 27, 2025
INVENTOR(S) : Zhang et al.

Page 1 of 1

It is certified that error appears in the above-identified patent and that said Letters Patent is hereby corrected as shown below:

In the Claims

In Column 19, Claim 20, Line 4, delete "avatar as" and insert -- avatar as a session avatar --, therefor.

Signed and Sealed this
Twenty-second Day of July, 2025

Coke Morgan Stewart
*Acting Director of the United States Patent and Trademark Office*